United States Patent [19]

Crandall

[11] Patent Number: 4,629,061

[45] Date of Patent: Dec. 16, 1986

[54] BELT STEERING CONTROL SYSTEM

[75] Inventor: Robert E. Crandall, Greendale, Wis.

[73] Assignee: Rexnord Inc., Brookfield, Wis.

[21] Appl. No.: 725,965

[22] Filed: Apr. 22, 1985

Related U.S. Application Data

[62] Division of Ser. No. 540,461, Oct. 11, 1983, Pat. No. 4,544,061.

[51] Int. Cl.[4] .......... B65G 39/16

[52] U.S. Cl. .......... 198/807; 474/102; 226/23

[58] Field of Search .......... 198/502, 807, 808, 810, 198/502.1; 474/102-104; 226/21, 23

[56] References Cited

U.S. PATENT DOCUMENTS

| | | | |
|---|---|---|---|
| 2,720,231 | 10/1955 | Hessler et al. | 474/104 |
| 2,777,331 | 1/1957 | Cruickshanks | 474/104 |
| 3,184,374 | 5/1965 | Pearson | 474/104 |
| 3,312,335 | 4/1967 | Paris et al. | 198/807 |
| 4,354,595 | 10/1982 | Reynolds | 198/807 |

*Primary Examiner*—Joseph E. Valenza
*Attorney, Agent, or Firm*—Lawrence J. Crain

[57] ABSTRACT

A belt steering control system for a belt press having a frame and a plurality of rolls around which a pair of belts passes, said system comprising a paddle-type belt edge position sensor lightly biased against the edge of the belt for sensing the actual position of the belt edge and producing an error signal indicative of the deviation of the belt edge relative to its position where the belt is centered; the paddle sensor being connected by a control shaft to a rotary drive transfer means; the drive transfer means transmitting movement of the paddle sensor to a rotary hydraulic valve by means of a variably tensioned, spring-loaded disc which engages the rotary drive transfer means; a belt steering roll around which the belt is trained and having two ends mounted in bearings on the frame, one of the ends being mounted for translation relative to the frame; and a steering roll actuator which is controlled by the rotary hydraulic valve and skews the steering roll when necessary to maintain proper belt tracking.

2 Claims, 3 Drawing Figures

BELT STEERING CONTROL SYSTEM

This application is a division of application Ser. No. 6/540,461, filed 10/11/83, now U.S. Pat. No. 4,544,061.

BACKGROUND OF THE INVENTION

This invention relates to a belt press for increasing the solids concentration of a slurry by reducing the liquid component.

Belt presses have been known for many years and have been used in many applications, such as the dewatering of sewage sludge, peat, industrial wastes, cement slurries, and coal slurries. The belt press of the present invention was designed to handle large volumes of slurry containing a wide variety of solids, including coarse, abrasive, relatively incompressible materials as well as fines, such as occur in coal tailings slurry, but could be used in other applications as well.

One application in which a belt press is particularly suitable is for dewatering of coal tailings. Coal tailings are the materials that are washed from coal after it has been crushed. The wash water from the coal washing operation is pumped into a thickener, such as a large cylindrical tank, where the solids settle to the bottom and the clear water flows out of a top launder for reuse in the coal washer. The settled material is collected at the bottom and is pumped out of the thickener. This material, known as the thickener underflow, typically contains about 60–80% water and about 20–40% solids. The solids include minerals such as rock, chemically undesirable materials such as pyrites, and fines such as clay, silt and coal fines. In the past, the underflow has been pumped into settlement ponds with the purpose of allowing the water to percolate down into the ground. In practice, this has not been a satisfactory method of disposal because the fines in the tailings sink to the bottom and form an impervious blanket that retains the water in the bond. Since the ponds remain fluid for years, the land usage of this procedure is excessive. If the tailing slurry could be dewatered prior to disposal, it could be handled and used like dirt for strip mine backfill and other useful purposes. Effective dewatering of the tailing slurry would convert this material from a problem to an asset.

Belt tracking systems which are intended to keep the belt running in a straight line are known in the art. The belt tracking systems typically include a sensor for determining when the belt is deviating from center, a steering roll which can be skewed relative to the line of travel of the belt in order to steer the belt back into the proper alignment, and a roll steering mechanism for controlling the angle of the steering roll. In belt tracking systems of the prior art, the rolls are typically mounted on bearings which can tip or be deflected upward or downward. These undesired bearing motions may misalign and prematurely wear out the bearing or unduly stretch the belt. It also reduces the tracking effect of the roll which necessitates increased steering motion and further exacerbates the wear problem. The present invention includes a roll mounting system which overcomes these problems.

SUMMARY OF THE INVENTION

Accordingly, it is an object of this invention to provide a belt press having a frame and a belt steering and control mechanism that senses variations in belt tracking, and accordingly produces gradual changes to the belt steering roll to prevent over steering and "hunting" of the steering roll, and also securely anchors the roll bearing in a manner that permits smooth movement of the bearing in the direction of belt movement, but prevents tilting or cocking of the bearing on or about the steering structure.

More specifically, the present invention provides a belt sensor comprised of a paddle arm biased lightly against the edge of the belt, a pivoting control shaft, a rotary drive transfer means including a slotted disk and a rotary hydraulic valve. The paddle arm is designed to pivot with the control shaft, and that pivoting movement is transmitted to the hydraulic valve via the rotary drive transfer means. An adjustable leaf spring with engages the slot of the slotted disk provides the biasing force of the paddle arm against the edge of the belt.

As the belt moves laterally on the steering roll, the paddle arm signals the hydraulic valve to adjust the skew of the steering roll. The steering roll is mounted on the frame by means of a steering control actuator mechanism including a hydraulically operated slide block, so that vertical misalignment of the steering roll is minimized.

It is a further object of this invention to provide a belt press having structure and modes of operation that greatly extend the useful life of the belt.

BRIEF DESCRIPTION OF THE DRAWINGS

The invention and its many attendant objects and advantages will be better understood upon reading the following description of the preferred embodiment in conjunction with the following drawings, wherein.

DESCRIPTION OF THE PREFERRED EMBODIMENT

Figure 1:
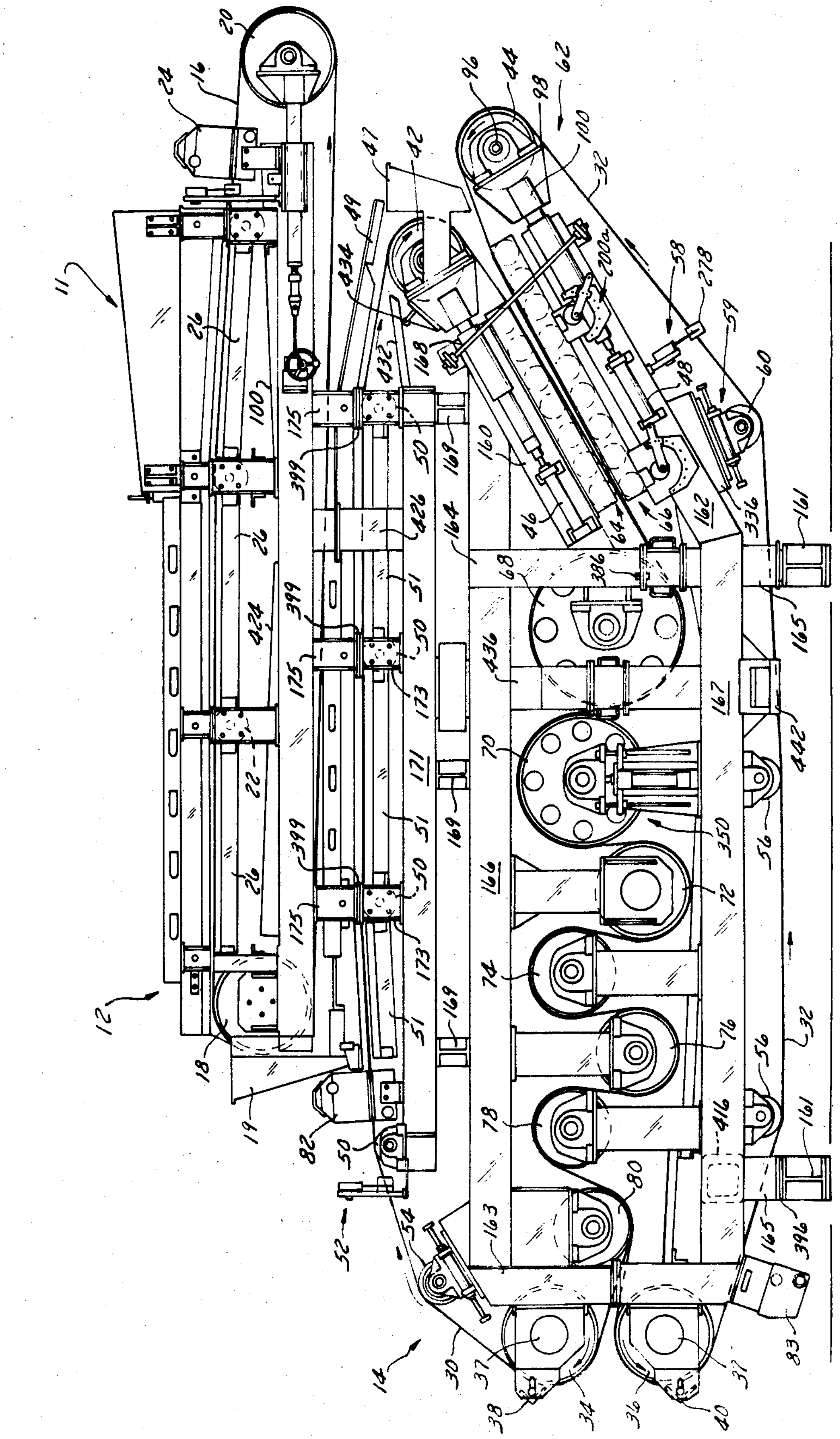
FIG. 1 is a side elevation of a belt press made in accordance with this invention.

Referring now to the drawings wherein like reference numerals refer to identical or corresponding parts, and more particularly to FIG. 1 thereof, a belt press according to this invention is shown. For the sake of clarity and convenience, the side of the belt press seen in FIG. 1 will be referred to as the "near" side, and the opposite side will be referred to as the "far" side. The end of the belt press to the right in FIG. 1 will be referred to as the "front" end, and the end to the left will be referred to as the "rear" end. The direction of belt movement in the wedge section 62 at the front end of the press will be referred to as the "axial" direction, and the direction across the machine, from side to side, will be referred to as the "transverse" direction. The machine is symmetrical about a vertical plane containing the longitudinal axis of the machine, parallel to the plane of FIG. 1. For the sake of succinctness, the description of one side will also be understood to apply to the other side as well, unless stated otherwise.

The belt press has an upper deck 12 and a lower deck 14. The upper deck 12 includes a single belt 16 which is driven by a drive roll 18 and is tensioned by a tensioning roll 20. The belt 16 is intermediately supported by a series of smaller rolls 22. The upper deck also includes a belt washer 24 and a distribution box 11 for receiving and spreading the slurry uniformly over the belt. The belt 16 is supported on a grid 26 made of polymeric material such as a filled polyester which is worn by the belt to produce a sharp leadng edge at the shoulder of each lateral piece of the grid in contact with the belt. The belt 16 is supported on the rolls 18, 20 and 22 so that, when unloaded, it runs above and out of contact with the grid 26 to reduce wear, and when loaded with slurry, runs in contact with the grid to facilitate removal of liquid from the underside of the belt. The rolls 22 also produce a more uniform wear pattern on the grid 26. This phenomonon has not been satisfactorily explained, but the grid wear is clearly more uniform and not as fast as it would be without the rolls 22. It is possible to operate the belt press lower deck 14 without an upper deck 12, in which case the slurry would be introduced directly onto the lower deck by means of a distribution box similar to the box 11 shown on the upper deck 12.

The lower deck 14 includes an upper belt 30 and a lower belt 32 which are driven by two drive rolls 34, 36 respectively. The belts are fine weave, endless polymeric mesh belts such as nylon mesh belts made by Appleton Wire, Appleton, WS. The drive motors are hydraulic motors 31 mounted directly on mounting brackets 29 projecting rearwardly from the frame, and are coaxial with the bearings for the rolls. The motors 31 drive planetary gear reduction units such as Torque Hub final drives (not shown) mounted within the rolls. The Torque Hub final drive is manufactured by Fairfield Manufacturing Company in Lafayette, Ind. under U.S. Pat. No. 3,737,000.

Two tensioning rolls 42, 44 are provided at the head or front end of the press for tensioning the belts 30, 32 respectively. The tensioning rolls 42, 44 exert and adjustable uniform tension on the belts 30 and 32 by a tensioning system 45 which includes two hydraulic cylinders 46, 48.

The upper belt 30 is supported along its top run by four small top rolls 50 which holds the belt off the grids when there is no slurry on the belt, for the same purpose as the rolls 22. A sensor 52 senses the belt position and controls a belt guiding roll 54 which maintains the belt in a straight tracking position. The guide system will be described in more detail later.

Similarly, the lower run of the lower belt 32 is supported by small rolls 56 which hold the belt downward to clear a lower drain trough. A sensor 58 senses the lateral position of the lower belt 32 and controls a steering control mechanism 59 for a steering roll 60, which maintains the belt 32 in proper alignment.

Figure 2:
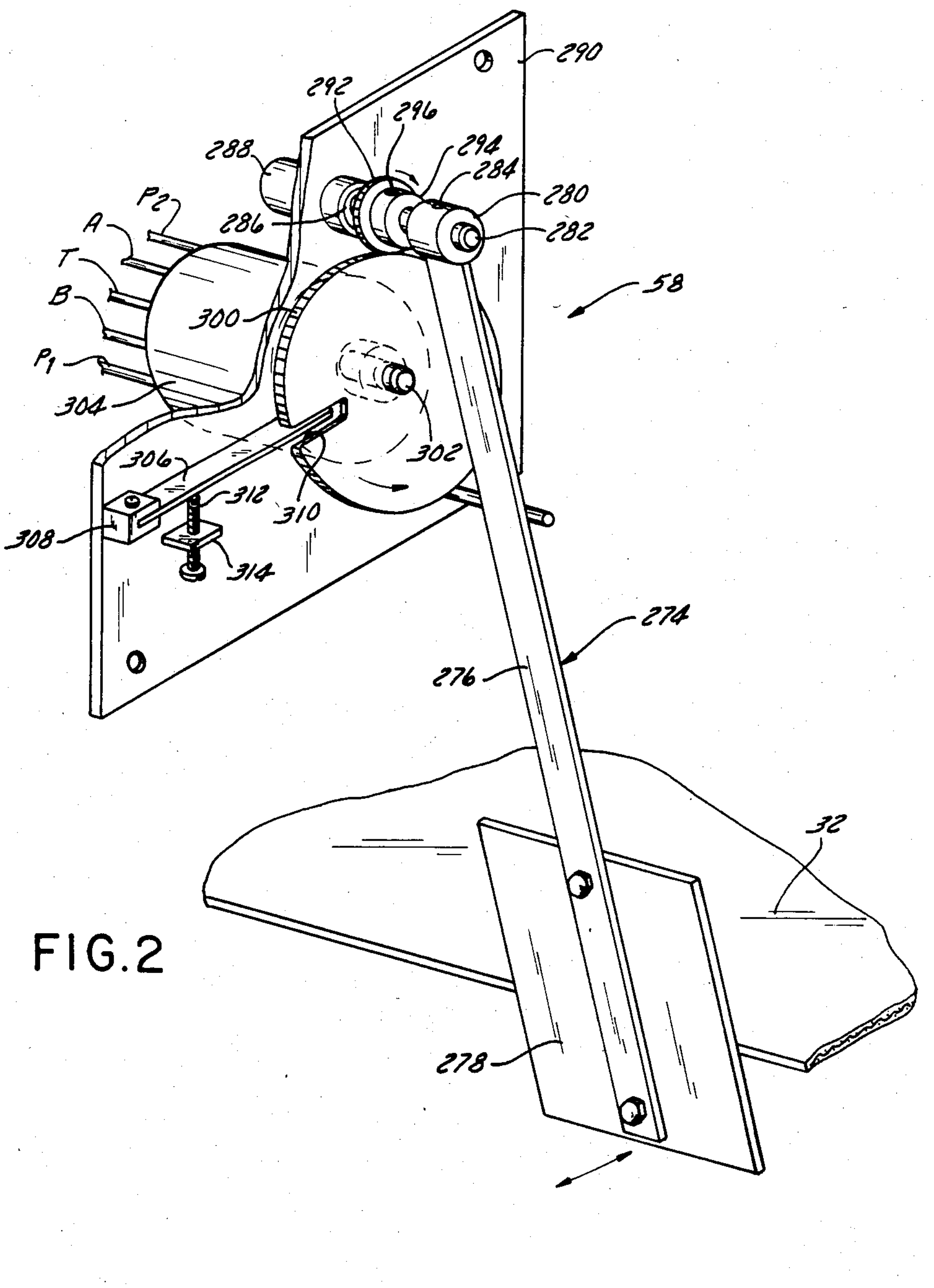
FIG. 2 is a perspective view of the roll steering mechanism shown in FIG. 1.

The tensioning rolls 42, 44 are at the upper forward end of a wedge section 62, best illustrated in FIG. 2. The belts 30, 32 enter the wedge section at a given gap or separation and then are gradually brought closer together by a pair of opposed racks of rolls 64 and 66 which press the liquid from the slurry. The position of the racks of rolls 64, 66 can be adjusted vertically, axially and angularly in order to achieve the best dewatering.

Referring again to FIG. 1, after the belts 30, 32 have passed out of the exit end of the wedge section 62, the belts move together in a serpentine path over a set of large rolls, beginning with two perforated rolls 68, 70. The perforated rolls 68, 70 have holes along their cylindrical surfaces and on their ends. The water drains into the rolls through the holes in their cylindrical surfaces and then flows out through the holes in the end plates of the rolls. In the case of the roll 70, the water will flow out the holes in the cylindrical surface in the bottom of the roll and also out the ends. In the case of the roll 68, the belts do not extend all the way to the edge of the cylindrical surface, so water flows out the holes which are beyond the edge of the belt and also out the holes in the ends. The pressure on the belts increases as the belts pass over the next five rolls 72, 74, 76, 78, and 80, until the cake is substantially dry. In the case of coal tailings slurry, the resulting cake has about 25–30% moisture.

The roll 70 is mounted on a vertically adjustable support which functions as a belt take-up and can also serve as a second belt tensioner whcih tensions both belts 30, 32.

The operation of the belt press is as follows: The slurry is pumped into the distribution box 11, which spreads it evenly over the belt 16. The belt 16 travels in a counterclockwise direction around the rolls 18 and 20 as shown in FIG. 1, and carries the slurry along the top run of the belt toward the drive roll 18, with water freely draining through the belt 16 along the way. The water is caught and conveyed away by a drain system. When the slurry reaches the tail or rear end of the belt 16, which is at the roll 18, it drops through a trough 19 onto the top run of the belt 30 just to the right of a belt washer 82. The top run of the belt 30 is moving to the right in FIG. 1, so the slurry reverses its direction, tumbles slightly which promotes water separation, and continues to drain freely as the belt 30 moves back toward the head end of the press. When the slurry reaches the front or head end of the press, which is at the tensioning roll 42, it is guided by a fence 49 into a trough 47 which funnels the slurry into the entry end of the wedge section 62 between the belts 30, 32. The slurry is carried through the wedge section 62 of the press where the water is gradually pressed out between the conveying belts 30, 32 by the upper and lower racks of rolls 64, 66 which apply gradually increasing pressure to the slurry. When the slurry emerges at the exit end of the wedge section 62 between the belts 30, 32, it is firmly compressed. It is carried by the belts in a serpentine path over and around the rolls 68, 70, 72, 74, 76, 78, 80, where it is subjected to shear by virtue of the multiple changes of direction, and also to gradually increasing pressure. When the belts emerge from the tail end at the rolls 34, 36, the cake is dry and is scraped from the belts by means of the doctor blades 38, 40. The belts 30, 32 are then backwashed by the belt wash units 82, 83 and the process continues with the belt 30 returning underneath the trough 19 to pick up more of the slurry, and the belt 32 returning forward under the machine back to the entry end of the wedge section 62.

Figure 3:
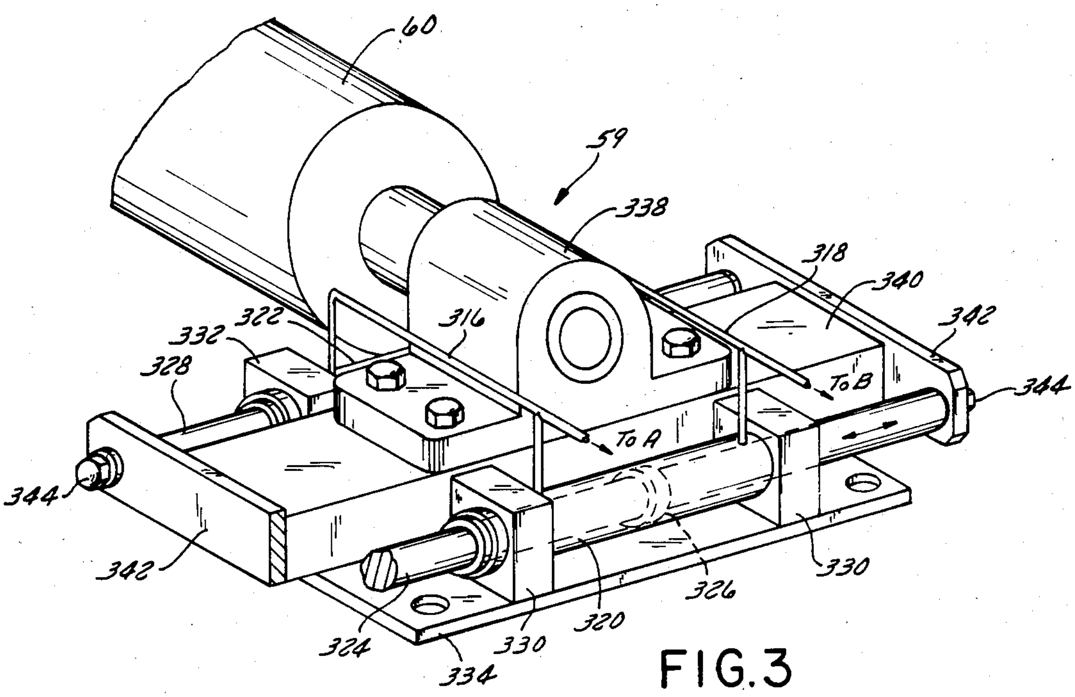
FIG. 3 is a perspective view of the belt sensor and control device shown in FIG. 1.

The belt tracking mechanism, shown in FIGS. 2 and 3, includes the belt edge sensor and control device 58, shown in FIG. 2, and the steering roll actuator mechanism 59, shown in FIG. 3, controlled by the control device 58. Looking first at FIG. 2, the belt edge sensor and control device 58 includes a paddle 274 having a paddle arm 276 and a paddle pad 278 fastened to the depending end of the arm 276. The pad 278 is formed of a low friction material such as high density or polyethylene and bears gently against the edge of the belt to sense the position of the belt edge.

The top end of the arm 276 is welded to a set collar 280 which is fixed to a cantilevered end of a control shaft 282 by a set screw 284. Swinging motion of the arm 276 as it follows the edge of the belt 32 causes the control shaft 282 to rotate in a sleeve bearing 286 held in a cylindrical bearing cartridge 288 which is fixed to a base plate 290.

A pinion 292 is coaxially disposed on the control shaft 282 and is fixed thereon by a set collar 294 welded to the pinion and fixed to the shaft 282 by a set screw 296. The pinion is engaged with a gear 300 which is connected to a control spindle 302 of a hydraulic control valve 304. The valve can be any suitable type, although the preferred valve is a controlled leakage rotary valve such as a model 375-SL-MG valve made by Microtork, Inc. in Redbank, N.J. This valve has two alternative pressure ports $P_1$ and $P_2$, two feed ports A and B, and a tank port T. When the arm 276 is at its centered (vertical) position, the control element in the valve 304 is centered and the pressure to both feed lines A and B is equal. When the belt is shifted laterally one way or the other, the arm follows the belt edge and rotates the control shaft 282 which rotates the pinion 292. The gear 300 is rotated by the pinion 292 which turns the control spindle 302 to move the valve control element (not shown) off center. This increases the flow area through the valve control surface from one of the feed lines A or B to the tank line T and decreases the flow area from the pressure line $p_1$ to that feed line. At the same time, it increases the flow area through the valve control surfaces from the pressure line $P_1$ to the other feed line while reducing the flow area to the tank line. The result of this shift of the valve control element is to increase the hydraulic pressure in one of the feed lines and decrease it in the other feed line. These hydraulic signals are converted by the actuator 59 into mechanical steering motion of the steering roll 60, as will be described below.

The bias of the paddle 274 against the belt edge is accomplished by a glass composite leaf spring 306, such as the previously mentioned Scotch Ply spring, acting on the gear 300. The glass composite spring 306 is anchored to the base plate 290 by a clamp 308 and extends inwardly toward the gear 300. A radial slot 310 in the gear 300 receives the end of the glass spring and provides the means by which the spring can exert a torque on the gear 300. The torque on the gear 300 is reduced by the pinion 292 to a gentle biasing torque on the arm 276 toward the edge of the belt 32. Since the arm swings no more than about 60° at the most in operation, and this swing is reduced by the pinion/gear reduction, the gear 300 will rotate no more than about 10°-15° in operation. Thus, the slot 310 in the gear 300, which is about 90° away from the pinion 292, will never be rotated up to the pinion.

The force of the spring 306 on the gear 300 can be adjusted by an adjustment screw 312 threaded into a bracket 314 fastened to the base plate. The end of the screw 312 bears against the underside of the glass composite spring 306 to give an upward bias to the spring in addition to its fixed bias set by the angle at which the clamp holds the spring. A cover, not shown, is screwed to the base plate over the gear and pinion to keep the gears clean. The cover has a portion of its bottom edge cut away to prevent interference by the cover with the arm 276 when it swings through its full range of motion.

The belt edge sensor and control device 58 shown in FIG. 2 controls the steering roll actuator mechanism 59 shown in FIG. 3. A pair of fluid lines 316 and 318 connected to ports A and B of the Microtork rotary control valve 304 are connected to opposite ends of a pair of parallel cylinders 320 and 322. A piston rod 324 extends from both faces of a piston 326 in the cylinder 320, and a corresponding rod 328 extends from both faces of a piston (not shown) in the cylinder 322. The cylinders are mounted on axially aligned blocks 330 and 332 fixed to an anchor plate 334 which is fixed by screws (not shown) to a plinth 336, shown in FIG. 1, welded to the frame.

The steering roll 60 is mounted at its two ends in bearings 338, only one of which is shown in FIG. 3. The bearing (not shown) on the far side of the roll 60 is fastened rigidly to the frame; the bearing on the near side of the roll is mounted on a slide block 340 of the steering roll actuator mechanism 59. The slide block 340 is slidably disposed between the mounting blocks 330. A pair of identical end plates 342 are welded to the ends of the slide block 340 and extend laterally beyond it on both sides. A bolt 344 at each end of the end plates 342 secures each laterally extending end of the end plates 342 to one end of the rods 324 and 328, respectively.

In operation, if the belt ever mistracks so that it begins shifting toward one or the other lateral sides of the machine, this shift will be detected by the belt edge position sensor and control device 58 which produces a charge in the hydraulic circuit to the steering roll actuator 59. For example, if the belt mistracks toward the far side, the paddle will follow that movement and, through the pinion 292 and the gear 300, rotate the control element of the valve to increase the pressure to the B port and decrease the pressure to the A port slightly. This causes a slight shift of the piston 326 in the cylinders 320, 322 toward the rear. The steering roll 60 controls the lateral position of the belt because the belt tends to run perpendicular to the axis of the roll 60. To steer the belt toward the far side of the machine, the near side of the roll 60 is moved toward the front end of the belt press. This causes the belt to gradually work its way toward the far side. The plane of the face of the plinth 336 to which the anchor plate 334 is attached is perpendicular to the plane bisecting the angle formed by the belt where is passes over the roll 60. This ensures that the movement of the near end of the roll 60, under operation of the actuator 59, will produce as little stretching of the belt as possible. When the belt reaches its center position, the paddle following the belt edge also reaches its center position and centers the control element in the valve 304 to equalize the pressure in the cylinders 320 and 322.

The belt press disclosed herein is a compact, efficient, durable machine that effectively dewaters slurry. The belt press is designed to obtain maximum useful life from the belt by providing a belt steering mechanism that produces minute, precise steering roll movements, and movements perpendicular to the bisector of the angle formed by the belt over the steering roll, so that belt stretching by the steering roll is minimized.

Obviously, numerous modifications and variations of the disclosed embodiment will occur to those skilled in the art in view of the disclosure and the prior art. Accordingly, it is expressly to be understood that these modifications and variations, and the equivalents thereof, may be practiced while remaining within the spirit and scope of the invention as set forth in the following claims.

What is claimed is:

1. A belt steering control system for an apparatus having a frame and a plurality of rolls around which at least one belt passes, said system including a belt edge position sensor comprising:

a paddle arm biased lightly against the edge of said belt and having a paddle end and a pivot end;

a control shaft having an outwardly projecting end, a frame end and having a longitudinal axis, said shaft mounted in said frame to be rotatable about said axis, said pivot end of said paddle arm secured to said outwardly projecting end of said control shaft;

rotary drive transfer means mounted to said control shaft;

a rotary hydraulic valve having a rotary control shaft;

a disk having a central axial bore which engages said control shaft and a radial slot, said disk mounted on said frame to rotatably engage said rotary drive transfer means;

an elongate leaf spring having a base end and a disk end; said base end secured to said frame so that said disk end engages said slot in said disk end; and spring adjusting means secured to said frame adjacent to said spring;

wherein lateral movement of said belt on said rolls is transmitted to said rotary hydraulic valve by means of said control arm, said rotary drive transfer means and said slotted disk is adjustably tensioned by said spring.

2. The belt control apparatus defined in claim 1 wherein said rotary drive means comprises a toothed pinion gear and said disk includes a toothed peripheral edge, the teeth of said pinion constructed and arranged to engage the teeth of said disk.

* * * * *